US012613345B2

(12) United States Patent
Tang et al.

(10) Patent No.: US 12,613,345 B2
(45) Date of Patent: Apr. 28, 2026

(54) CONDITIONS ON TRIGGERING GNSS POSITION FIX

(71) Applicant: MediaTek Singapore Pte. Ltd., Singapore (SG)

(72) Inventors: Wen Tang, Beijing (CN); Gilles Charbit, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 281 days.

(21) Appl. No.: 18/367,023

(22) Filed: Sep. 12, 2023

(65) Prior Publication Data

US 2024/0085569 A1 Mar. 14, 2024

(30) Foreign Application Priority Data

Sep. 8, 2023 (CN) .......................... 202311156880.7

(51) Int. Cl.
*G01S 19/09* (2010.01)
(52) U.S. Cl.
CPC ................................... *G01S 19/09* (2013.01)

(58) Field of Classification Search
CPC ....................................................... G01S 19/09
USPC ..................................................... 342/357.46
See application file for complete search history.

(56) References Cited

U.S. PATENT DOCUMENTS

2025/0220612 A1 * 7/2025 Wen ..................... H04B 7/1851

* cited by examiner

*Primary Examiner* — Harry K Liu
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus may be a UE. In certain configurations, the UE determines a global navigation satellite system (GNSS) validity duration or a remaining GNSS validity duration indicating a time duration for which a GNSS position fix is valid. The UE reports, to a base station, GNSS assistance information including the GNSS validity duration or the remaining GNSS validity duration. The UE attempts to acquire, at the UE and in a radio resource control (RRC) connected state, the GNSS position fix periodically or aperiodically.

18 Claims, 17 Drawing Sheets

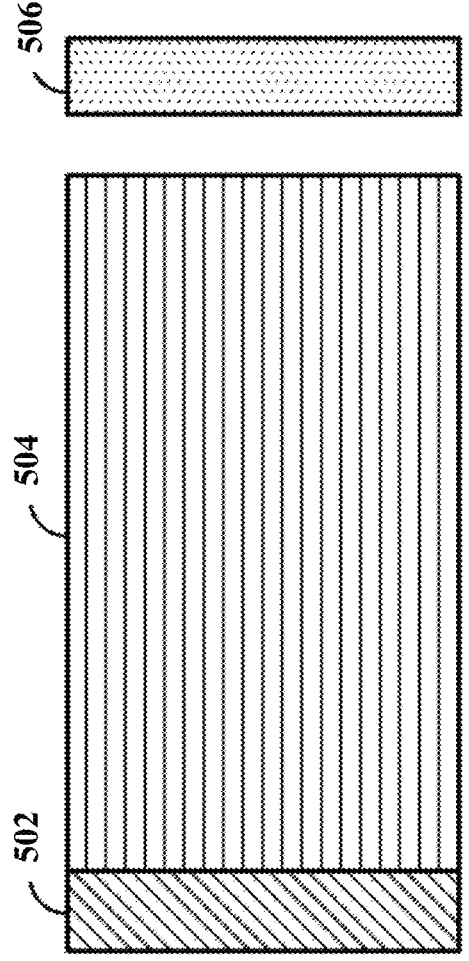
506
504
502
500
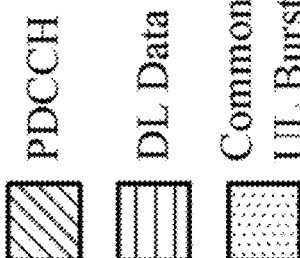
PDCCH
DL Data
Common
UL Burst
FIG. 5

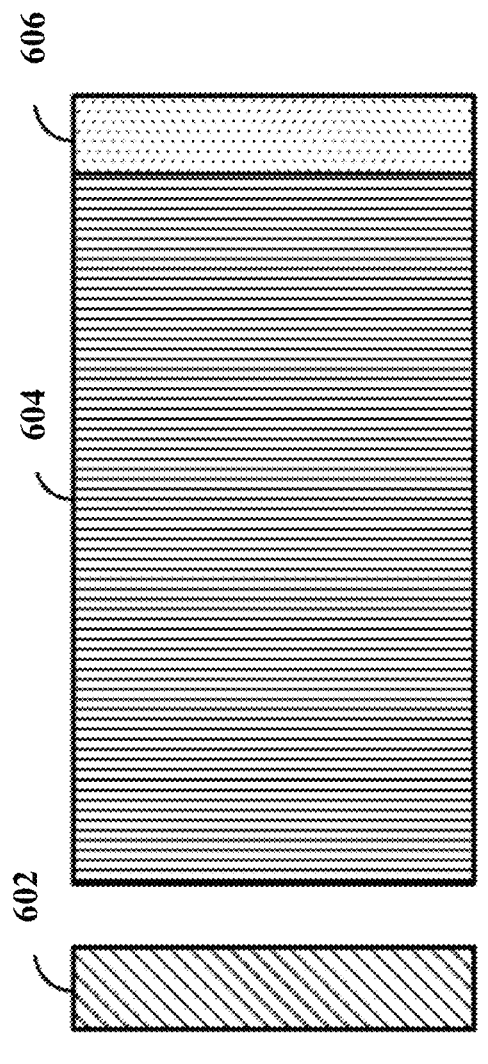
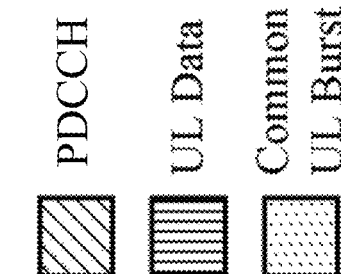
FIG. 6

GNSS Satellites

730

730

720

GNSS assistance information

GNSS measurement trigger

710

700

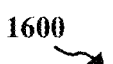

1600

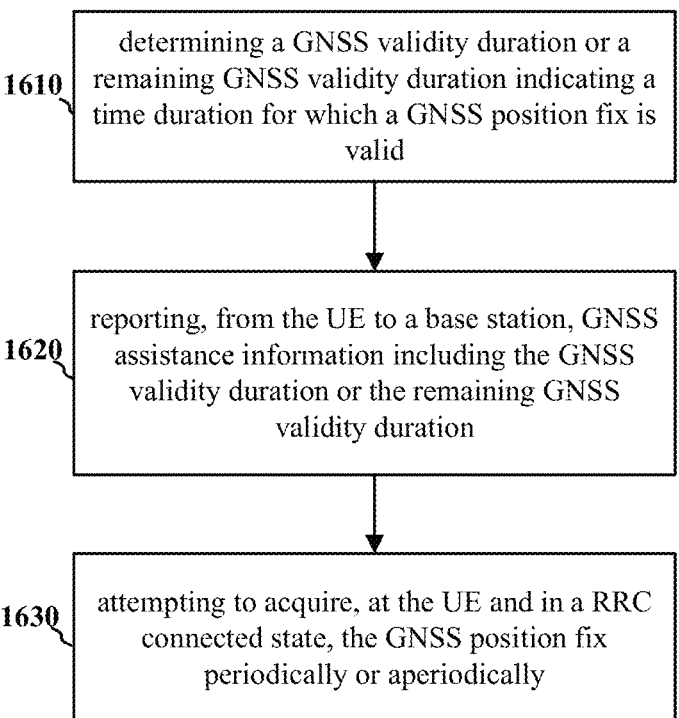

1610   determining a GNSS validity duration or a remaining GNSS validity duration indicating a time duration for which a GNSS position fix is valid 1620   reporting, from the UE to a base station, GNSS assistance information including the GNSS validity duration or the remaining GNSS validity duration 1630   attempting to acquire, at the UE and in a RRC connected state, the GNSS position fix periodically or aperiodically

FIG. 16

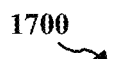
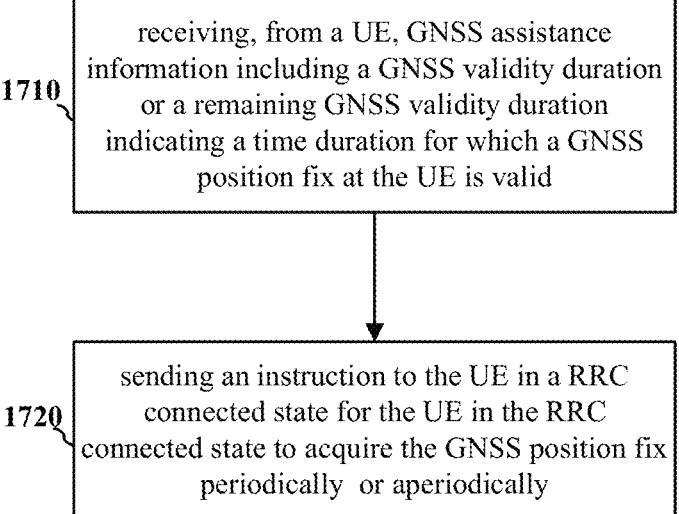
1710
receiving, from a UE, GNSS assistance information including a GNSS validity duration or a remaining GNSS validity duration indicating a time duration for which a GNSS position fix at the UE is valid
1720
sending an instruction to the UE in a RRC connected state for the UE in the RRC connected state to acquire the GNSS position fix periodically or aperiodically
FIG. 17

CONDITIONS ON TRIGGERING GNSS POSITION FIX

CROSS-REFERENCE TO RELATED APPLICATION(S)

This application claims the benefits of PCT Application Number PCT/CN2022/118420, entitled "CONDITIONS ON TRIGGERING GNSS POSITION FIX IN NTN" and filed on Sep. 13, 2022, which is expressly incorporated by reference herein in its entirety.

BACKGROUND

Field

The present disclosure relates generally to communication systems, and more particularly, to techniques of methods and apparatuses about schemes and conditions on triggering a user equipment (UE) to re-acquire a global navigation satellite system (GNSS) position fix.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In certain configurations, the UE determines a global navigation satellite system (GNSS) validity duration or a remaining GNSS validity duration indicating a time duration for which a GNSS position fix is valid. The UE reports, to a base station, GNSS assistance information including the GNSS validity duration or the remaining GNSS validity duration. The UE attempts to acquire, at the UE and in a radio resource control (RRC) connected state, the GNSS position fix periodically or aperiodically.

In another aspect of the disclosure, a method, a computer-readable medium, and an apparatus are provided. The apparatus may be a base station. In certain configurations, the base station receives, from a UE, GNSS assistance information including a GNSS validity duration or a remaining GNSS validity duration indicating a time duration for which a GNSS position fix at the UE is valid. The base station sends an instruction to the UE in a radio resource control (RRC) connected state for the UE in the RRC connected state to acquire the GNSS position fix periodically or aperiodically.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

FIG. 16 is a flow chart of a method (process) for wireless communication of a UE.

FIG. 17 is a flow chart of a method (process) for wireless communication of a base station.

DETAILED DESCRIPTION

Figure 1:
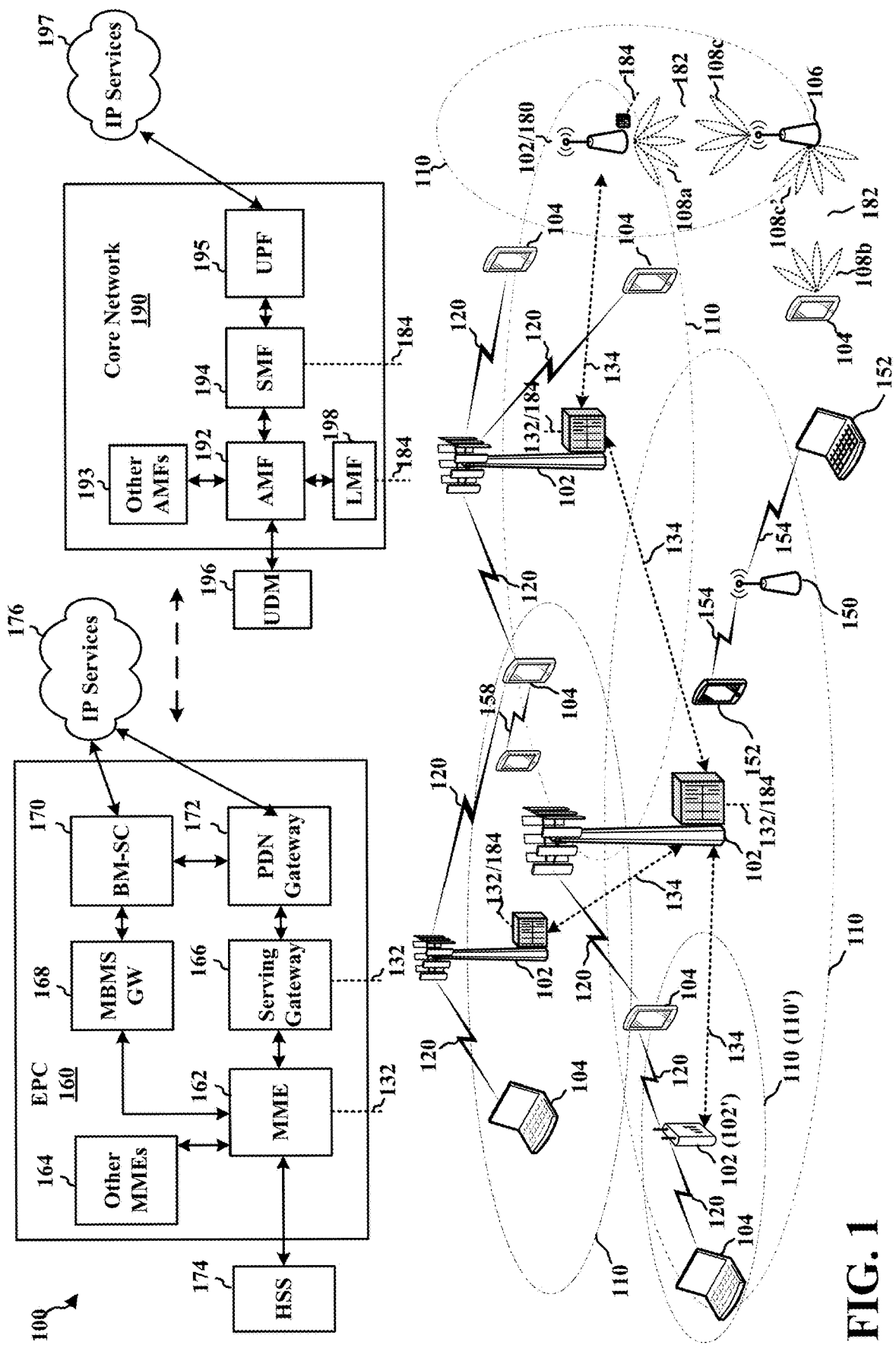
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108a. The UE 104 may receive the beamformed signal from the base station 180 in one or more receive directions 108b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
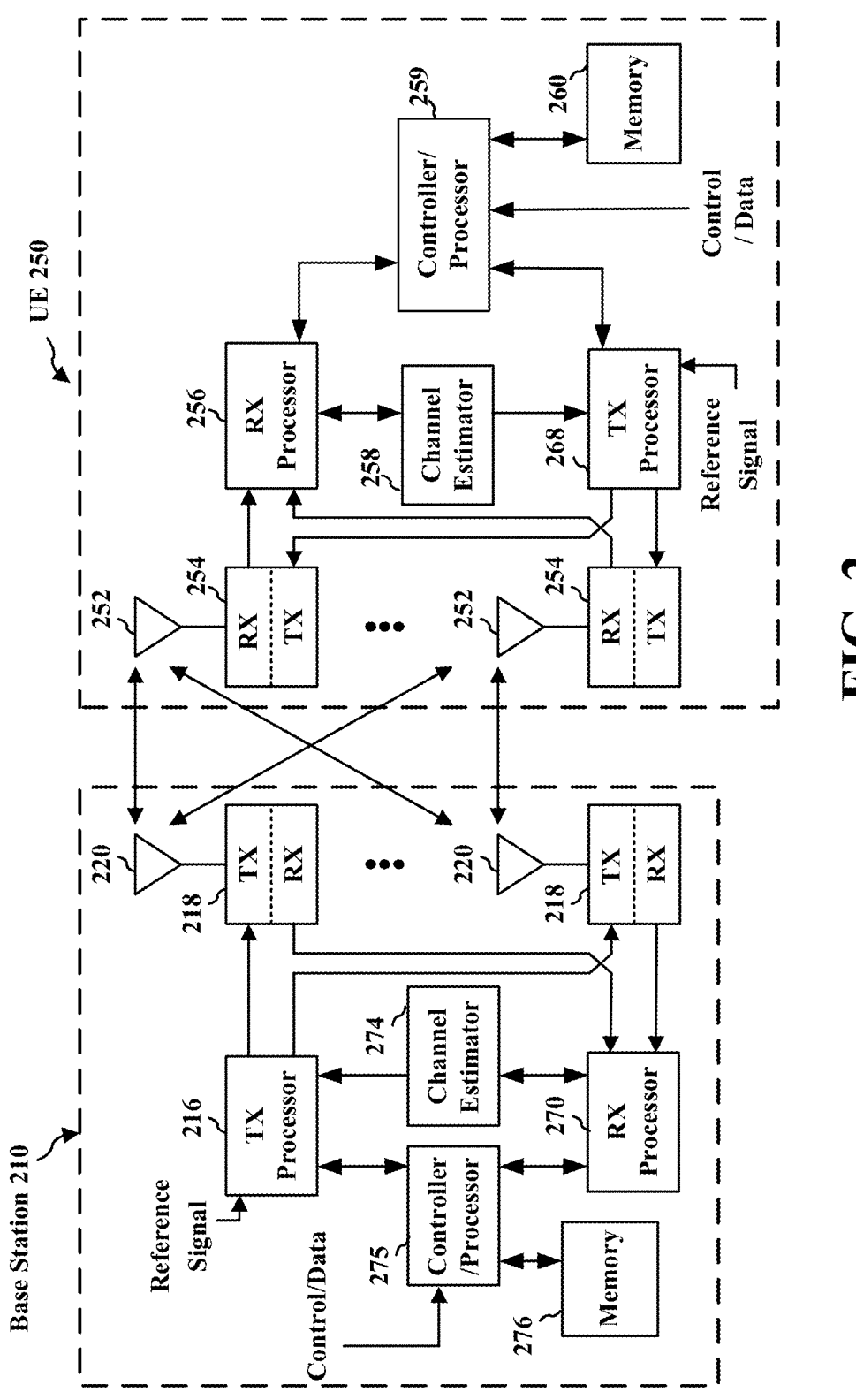
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
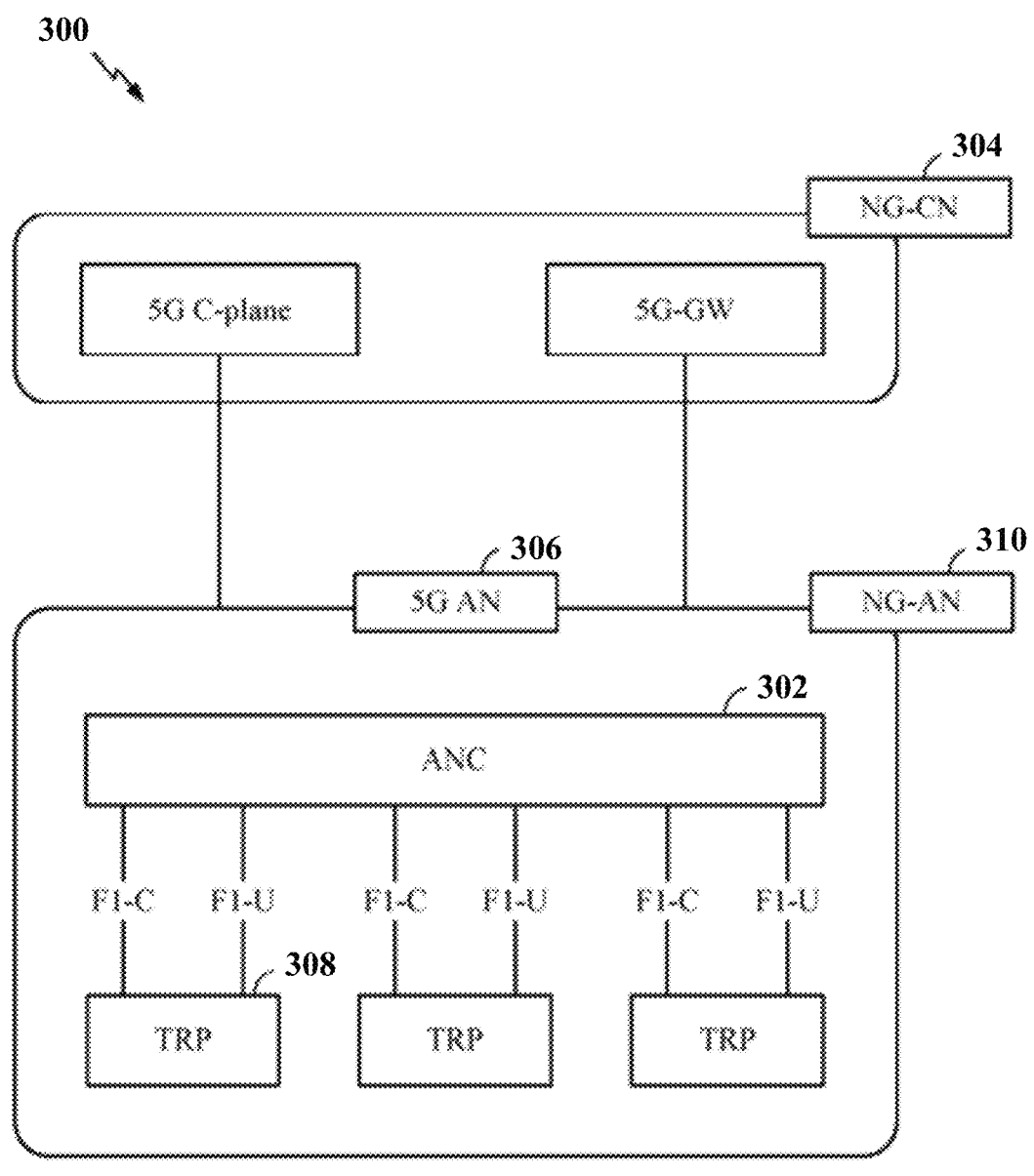
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
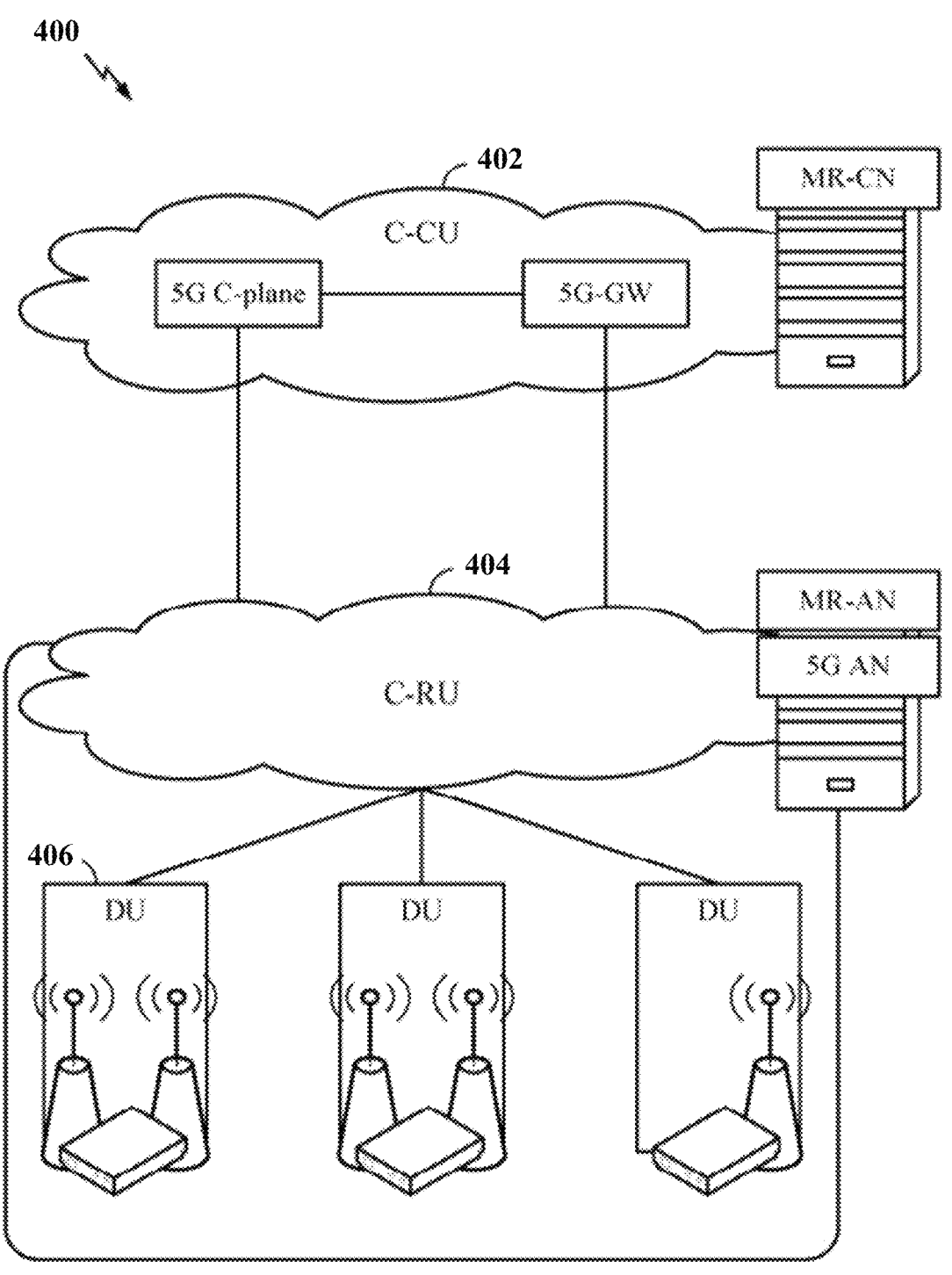
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The non terrestrial network (NTN) refers to a network that uses radio frequency and information processing resources carried on high, medium and low orbit satellites or other high-altitude communication platforms to provide communication services for UEs. Specifically, an NTN system can provide communication services in areas without a terrestrial network (TN) service. In the NTN system, UE GNSS is necessary for uplink time and frequency synchronization. According to the load capacity on the satellite, there are two typical scenarios: transparent payload and regenerative payload. The transparent payload mode means that the satellite will not process the signal and waveform in the communication service, but only forward the data as an RF amplifier. Regenerative payload mode refers to the satellite, besides RF amplification, also has the processing capabilities of modulation/demodulation, coding/decoding, switching, routing and so on.

In one aspect of the invention, due to large time delay and Doppler frequency shift, the UE needs to do pre-compensation of time delay and frequency offset based on the UE GNSS and ephemeris related parameters. For example, for GNSS position fix time duration for measurement, a hot start requires about 1-2 seconds, a warm start requires several seconds, and a cold start requires about 30 seconds. Thus, the UE should report GNSS assistance information to help the network to make better scheduling decision for long-term connection. For instance, the GNSS validity duration reported by the UE can be used by the network to decide when to stop scheduling to avoid interruption during long-term connection, and let the UE re-acquire the GNSS position fix. Reporting of the GNSS position fix time duration for measurement can allow the network and the UE to have common understanding on the duration that the UE needs to update GNSS, and further help the network better schedule the UE, e.g., configuring the UE to get into idle mode when a cold start for GNSS is needed. Accordingly, considering the NTN scenario, certain aspects of the present invention relate to designs and schemes to trigger UE to re-acquire GNSS position fix in long connection time, to ensure the normal operation of NTN system.

Figure 7:
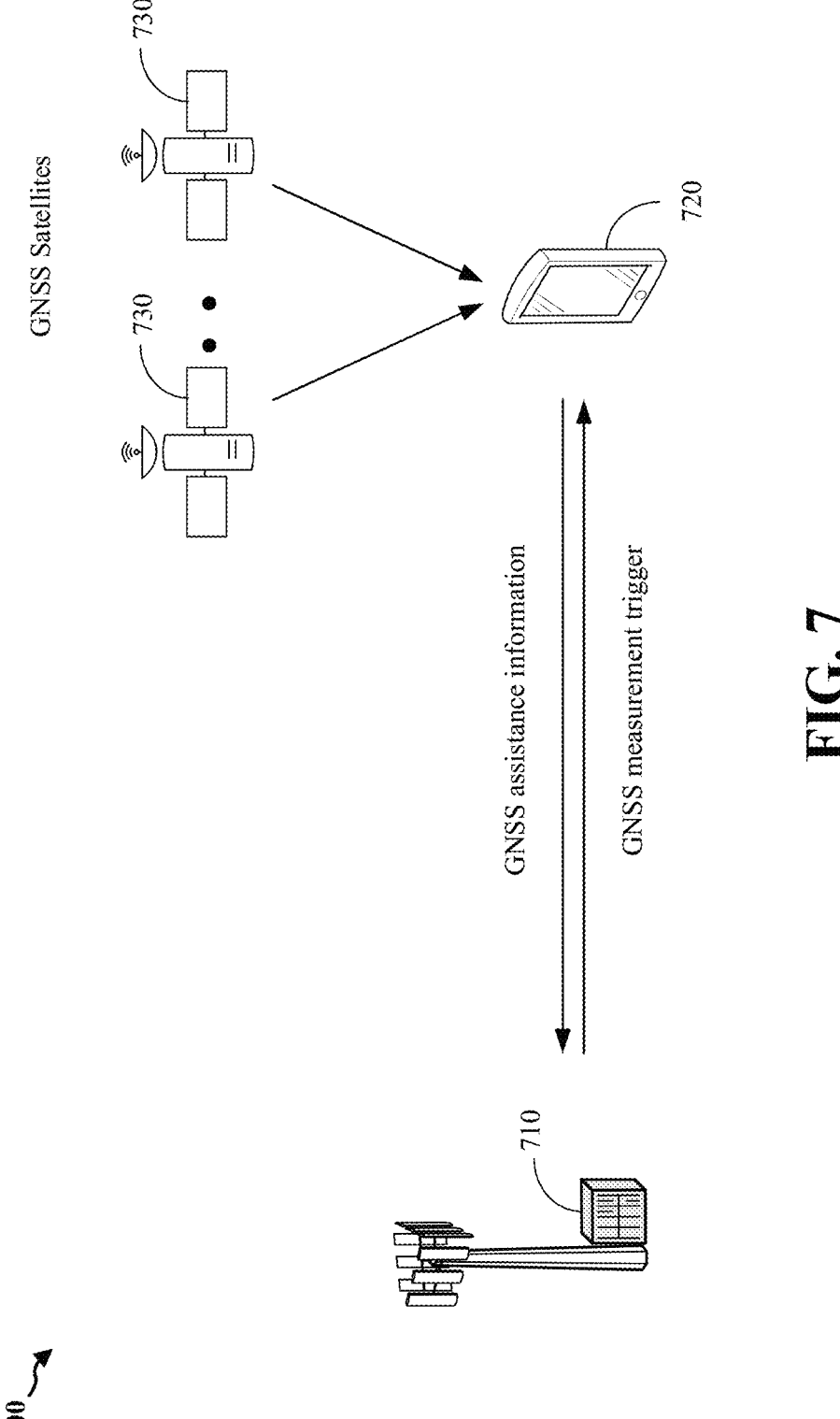
FIG. 7 is a diagram illustrating example communication between a UE and the NTN system.

FIG. 7 is a diagram illustrating example communication between a UE and a base station. In the scheme 700, a base station 710, which may be represented by a gNB, communicates with the UE 720. Initially, when the UE 720 is in the idle state, the UE 720 may perform GNSS measurement of signals transmitted from GNSS satellites 730. Then, the UE 720 may enter a connected state, in which the UE 720 may transmit uplink signals with certain information the base station 710. Specifically, the uplink signals may include, among other things, GNSS assistance information. Upon receiving the uplink signals with the information from the UE 720, the base station 710 generates and transmits a GNSS position fix indication such as a GNSS measurement trigger to the UE 720. In response to receiving the GNSS measurement trigger, the UE 720 may perform a GNSS measurement and acquire a GNSS position fix.

In certain configurations, while in the RRC connected state, the UE 720 may transmit, to the base station 710, GNSS assistance information in a radio resource control (RRC)-connected state through RRC signaling or in a Medium Access Control (MAC) control element (CE).

In one aspect of the present invention, the UE 720 reports the GNSS assistance information to the base station 710. In certain embodiments, the GNSS assistance information includes a GNSS position fix time duration for measurement and a GNSS validity duration or a remaining GNSS validity duration indicating a time duration for the GNSS position fix to be valid. In certain embodiments, the UE 720 does GNSS position fix based on instructions or triggers sent by the base station 710.

In one aspect of the invention, to reduce the possible radio link failure, the GNSS position fix should be supported during long connection. As discussed, in 3GPP Release 17 for short sporadic transmission, the minimum value that the UE 720 can report for the remaining GNSS validity duration is 10 seconds. Hence, if the remaining GNSS validity duration is smaller than 10 seconds, the UE 720 in the idle state should make the GNSS measurement first, and then start the RRC establishment procedure. Thus, the UE 720 shall always report the GNSS validity duration (or the remaining GNSS validity duration) once moving to the RRC-connected state. It is up to the UE implementation to ensure that, when the UE 720 is in the idle state, the UE 720 has a GNSS position fix that is at least valid for the GNSS-ValidityDuration value it reports when moving to the RRC-connected state. The idle UE 720 can trigger the GNSS measurement before moving to RRC-connected state if the remaining GNSS validity duration value is less than the minimum GNSS validity duration value the UE 720 can report. In 3GPP Release 18 for long-term connection, the UE 720 will report the GNSS assistance information that at least includes the GNSS position fix time duration for measurement and the GNSS validity duration (or the remaining GNSS validity duration), and the base station 710 may instruct or trigger the UE 720 to make the GNSS measurements. In response to the instruction or the trigger from the base station, the UE 720 in the RRC-connected state acquires (or attempts to acquire) the GNSS position fix.

Depending on the mobility of the UE 720, the UE 720 in the RRC-connected state will need a new GNSS position fix in order to accommodate the accumulated time and frequency errors to reduce the possible radio link failure. In certain embodiments, the UE 720 (especially one with high speed) may need frequent GNSS position fix during the long-term connection, which will introduce large power consumption. Further, for long connection time, if the UE 720 always re-acquires the GNSS position fix in the idle state, additional re-accesses to the base station 710 are needed, which is costing in terms of signaling overhead and delay. Accordingly, considering the scenarios like NTN, certain aspects of the present invention relate to designs and schemes on when the network triggers the UE to re-acquire the GNSS position fix and the details of signaling, so as to ensure normal system operation of the NTN system.

In certain embodiments, the base station 710 can trigger the UE 720 for the GNSS measurement to re-acquire the GNSS position fix based on a triggering rule, and the triggering rule may be based on a combination of parameters and timers.

Figure 8:
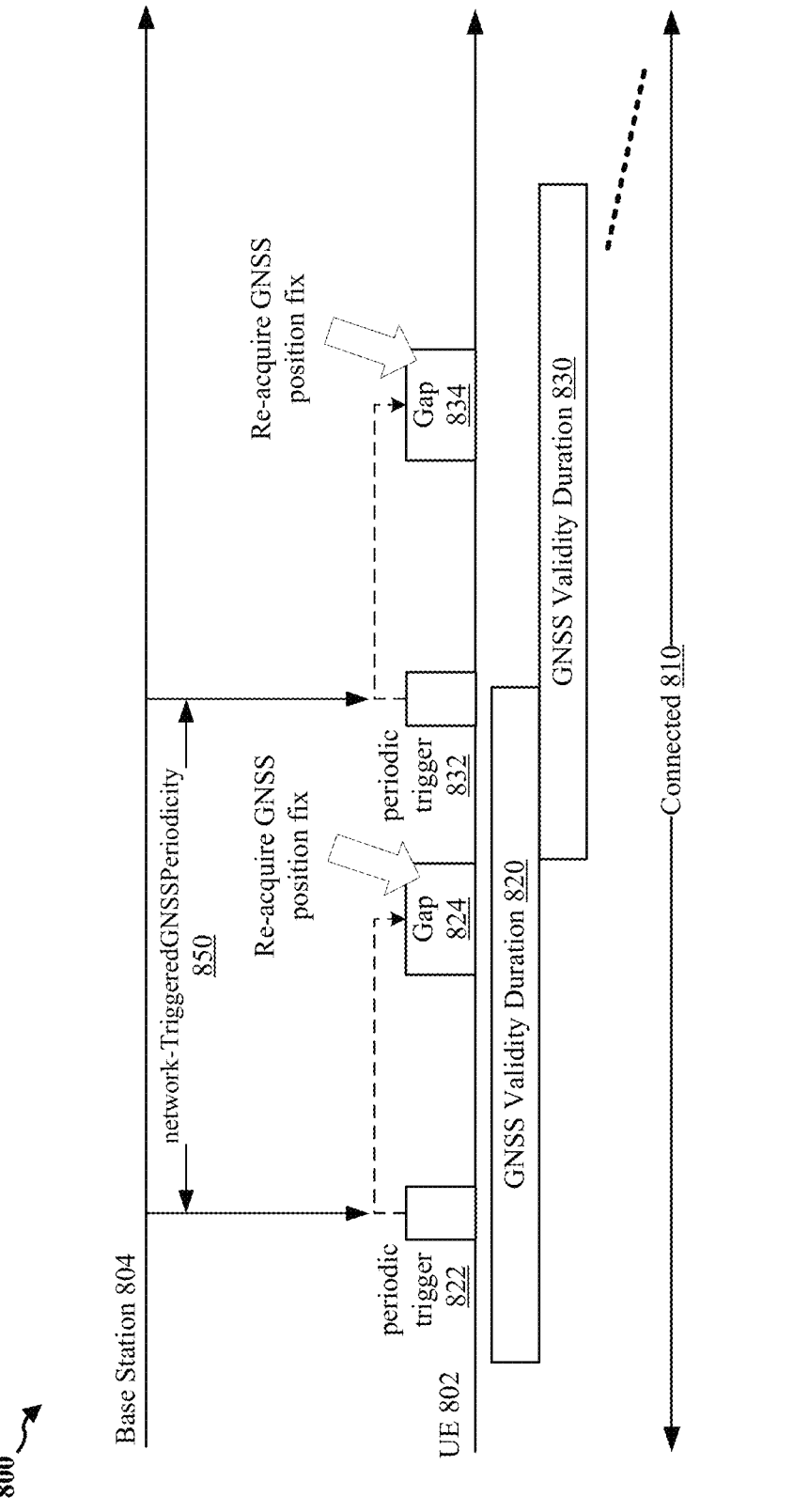
FIG. 8 is a diagram showing an example scheme of the UE receiving network triggers periodically from the base station.

In certain embodiments, the triggering rule may be a periodic trigger based on a periodicity parameter, e.g., a higher layer parameter network-TriggeredGNSSPeriodicity. In other words, the base station 710 can trigger the UE 720 for the GNSS measurement periodically (i.e., with a fixed period) based on a periodicity indicated by a value of the higher layer parameter network-TriggeredGNSSPeriodicity. FIG. 8 is a diagram showing an example scheme 800 of the UE 720 receiving network triggers periodically from the base station 710. As shown in FIG. 8, when the UE 802 is in the connected state 810, the UE 802 may be in a first GNSS validity duration (or a first remaining GNSS validity duration) 820. Within the first GNSS validity duration (or the first remaining GNSS validity duration) 820, the base station 804 may send a periodic trigger 822 to the UE 802, such that the UE 802, upon receiving the periodic trigger 822 from the base station 804, correspondingly creates a gap 824. Specifically, the UE 802 may create the gap 824 at a certain number of slots after receiving the periodic trigger 822. Thus, the UE 802 may perform the GNSS measurement in the gap 824 to re-acquire (or attempt to re-acquire) the GNSS position fix. After re-acquiring the GNSS position fix, the UE 802 may restart a second GNSS validity duration (or a second remaining GNSS validity duration) 830. Within the second GNSS validity duration (or the second remaining GNSS validity duration) 830, the base station 804 may send another periodic trigger 832 to the UE 802, such that the UE 802 correspondingly creates another gap 834, allowing the UE 802 to re-acquire (or attempt to re-acquire) the GNSS position fix in the gap 834. In certain configurations, each of the periodic triggers 822 and 832 may be a MAC CE, and the period between the two consecutive periodic triggers 822 and 832 is defined by the periodicity, i.e., the value of the higher layer parameter network-TriggeredGNSSPeriodicity 850. Specifically, the value of the higher layer parameter network-TriggeredGNSSPeriodicity 850 may be not larger than the value of each of the GNSS validity durations (or the remaining GNSS validity durations) 820 and 830 reported by the UE 802, such that the UE 802 may continuously maintain in the connected state 810. In certain embodiments, the higher layer parameter network-TriggeredGNSSPeriodicity 850 can be a cell-specific value broadcast on SIB or a UE-specific value indicated via dedicated RRC signaling or the MAC CE. In certain embodiments, instead of the periodic network trigger, it is also possible that the base station 804 may send an instruction to the UE 802 to configure the UE 802 with the periodicity parameter, i.e., the higher layer parameter network-TriggeredGNSSPeriodicity 850, such that the UE 802 may re-acquire the GNSS position fix periodically and autonomously based on the periodicity, i.e., the configured value of the higher layer parameter network-TriggeredGNSSPeriodicity 850.

In certain embodiments, instead of triggering the UE 720 periodically, the network (i.e., the base station 710) can aperiodically trigger the UE 720 to re-acquire the GNSS position fix in the RRC-connected state based on the UE reported GNSS assistance information and the UE uplink signal demodulation performance, transmit timing error and/or frequency error measured at the receiver of the base station 710. In this case, the timing for the base station 710 to send the triggers to the UE 720 is based on the triggering rule, and the triggers are not transmitted periodically. In certain configurations, the triggering rule may be based on a combination of parameters or factors. For example, in one embodiment, the triggering rule may be based on the GNSS validity duration (or the remaining GNSS validity duration) reported by the UE 720 and other factors. Specifically, the GNSS validity duration (or the remaining GNSS validity duration) is known to the base station 710 as it is reported by UE 720 when the UE 720 is in the RRC-connected state. Thus, the base station 710 can start an internal timer (i.e., the GNSS validity duration timer) which is initialized with the value of the GNSS validity duration (or the remaining GNSS validity duration) when the UE 720 moves to the RRC-connected state and reports. This allows the base station 710 to know at any time the GNSS validity duration (or the remaining GNSS validity duration) while the UE 720 remains in the connected state. On the other hand, once the UE 720 reports the GNSS validity duration (or the remaining GNSS validity duration) to the base station 710 and enters the RRC-connected state, the UE in the RRC connected state may monitor an aperiodic trigger transmitted from the base station 710. When the UE 720 receives the aperiodic trigger, the UE 720 may correspondingly determine a measurement gap based on the aperiodic trigger for acquiring (or attempting to acquire) the GNSS position fix in the measurement gap.

Figure 9:
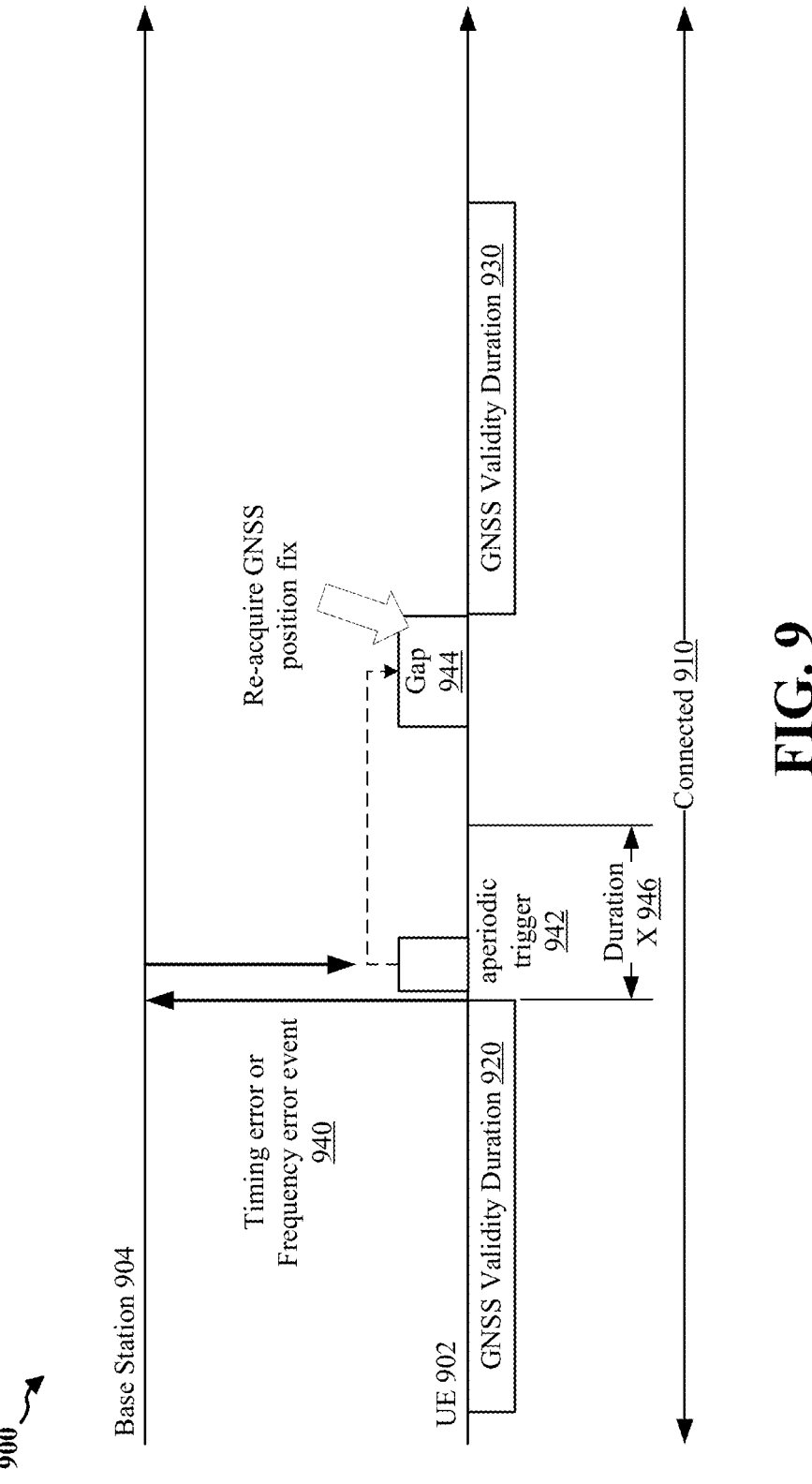
FIG. 9 is a diagram showing an example scheme of the UE receiving network triggers aperiodically from the base station.

In one embodiment, the triggering rule is based on the GNSS validity duration timer and a timing error or frequency error event. FIG. 9 is a diagram showing an example scheme 900 of the UE receiving network triggers aperiodically from the base station. As shown in FIG. 9, when the UE 902 is in the connected state 910, the UE 902 may be in a first GNSS validity duration (or a first remaining GNSS validity duration) 920. The triggering condition occurs when the GNSS validity duration timer (or the remaining GNSS validity duration timer) expires, and the base station 904 detects a timing error or frequency error event 940, where the base station 904 determines an uplink signal transmit timing error or frequency error to be above a threshold. For example, when the UE 902 transmits an uplink signal to the base station 904, the base station 904 determines that the timing error or frequency error event 940 occurs when a transmit timing error or a frequency error for the uplink signal is above the threshold. In other words, the base station 904 determines that a trigger is required when the GNSS validity duration timer (or the remaining GNSS validity duration timer) expires and the timing error or frequency error event 940 occurs. The threshold that triggers the timing error or frequency error event 940 may be network implementation specific, and can be a percentage of the maximum timing error or frequency error requirements. In one embodiment, the threshold can be cell-specific or UE-specific. When the triggering condition is met, the base station 904 sends a trigger 942 to the UE 902, such that the UE 902, upon receiving the trigger 942 from the base station 904, correspondingly creates a gap 944. Specifically, the UE 902 may create the gap 944 at a certain number of slots after receiving the trigger 942. Thus, the UE 902 may perform the GNSS measurement in the gap 944 to re-acquire the GNSS position fix. After re-acquiring the GNSS position fix, the UE 902 may restart a second GNSS validity duration (or a second remaining GNSS validity duration) 930, and the UE 902 may continuously maintain in the connected state 910. In certain configurations, the trigger 942 may be a MAC CE, and since the triggering condition is based on the timing error or frequency error event 940, the trigger 942 is not periodic.

As shown in FIG. 9, the base station 904 sends the trigger 942 after or at the end of the first GNSS validity duration or the first remaining GNSS validity duration 920 (i.e., after the GNSS validity duration timer expires). In certain embodiments, the base station 904 triggering of the GNSS measurements after the GNSS validity duration timer expires may not be needed if Closed Loop Time with or without Frequency correction with MAC CE Timing Advance Command (TAC) and maybe MAC CE Frequency Compensation Indication is sufficient to keep the transmit timing error and frequency error below a threshold, and the threshold value is up to implementation of the receiver of the base station 904. Specifically, when frequency error and timing error are within the frequency and timing error requirements with legacy closed loop time correction, the UE 902 may be allowed the uplink transmission in a duration X 946 after the original GNSS validity duration expires without GNSS re-acquisition. In other words, the UE 902 may monitor the trigger 942 transmitted from the base station 904 after the original GNSS validity duration 920 expires and within the duration X 946. In certain embodiments, the duration X 946 may be equal to a remaining timing alignment timer (which will be described later) or another value configured by the base station 904.

Figure 10:
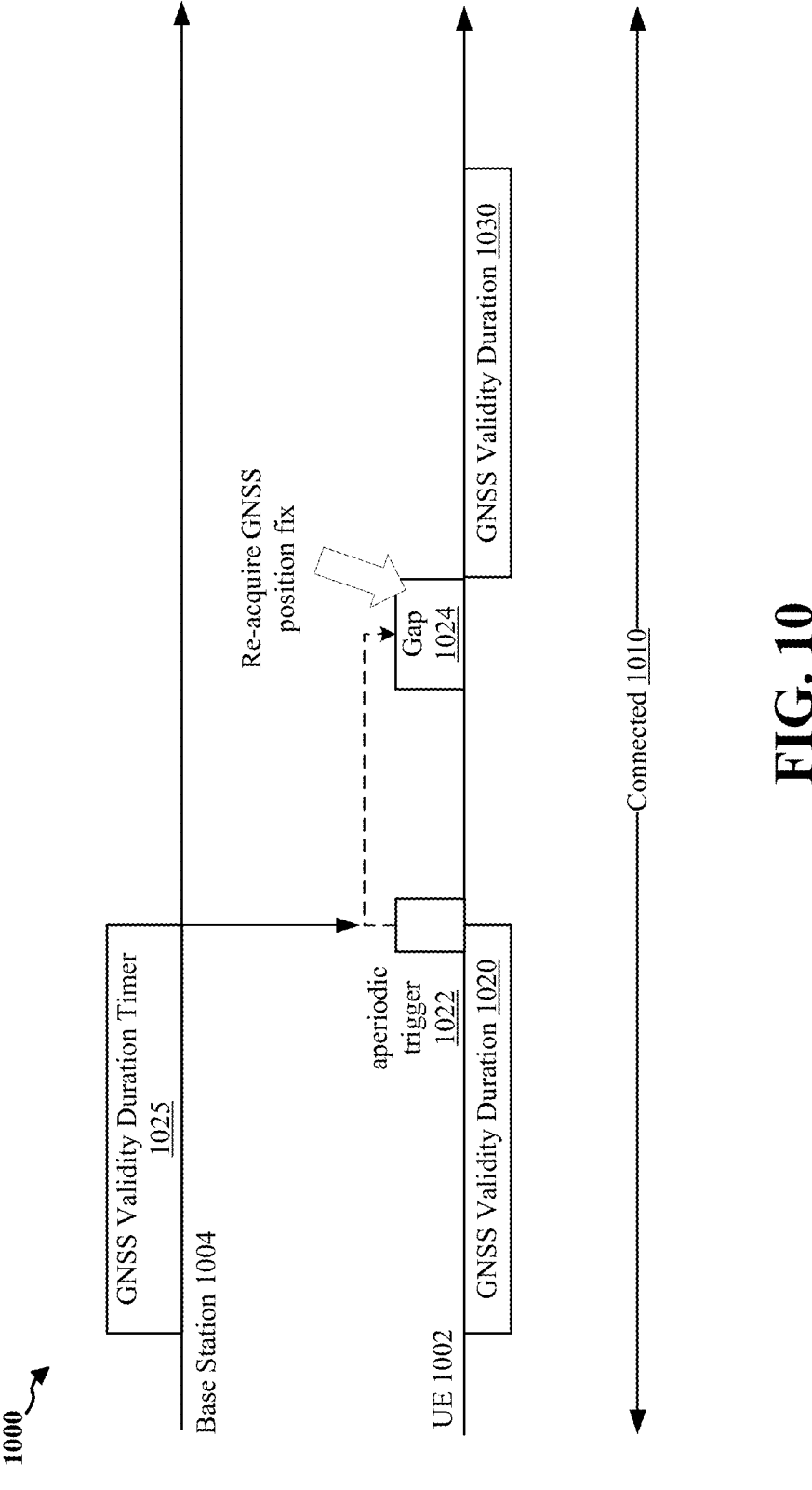
FIG. 10 is a diagram showing another example scheme of the UE receiving network triggers aperiodically from the base station.

In another embodiment, the triggering rule may be based on the GNSS validity duration timer only. FIG. 10 is a diagram showing another example scheme 1000 of the UE receiving network triggers aperiodically from the base station. As shown in FIG. 10, when the UE 1002 is in the connected state 1010, the UE 1002 may be in a first GNSS validity duration (or a first remaining GNSS validity duration) 1020. Correspondingly, the base station 1004 creates a GNSS validity duration timer (or a remaining GNSS validity duration timer) 1025 based on the GNSS validity duration (or the remaining GNSS validity duration) reported by the UE 1002. The triggering condition occurs when the GNSS validity duration timer (or the remaining GNSS validity duration timer) 1025 expires or a certain time before the timer expires, i.e., the first GNSS validity duration (or the first remaining GNSS validity duration) 1020 ends or a certain time before the first GNSS validity duration 1020 ends. In other words, the base station 1004 determines that a trigger is required when the GNSS validity duration timer (or the remaining GNSS validity duration timer) 1025 expires or a certain time before the GNSS validity duration timer (or the remaining GNSS validity duration timer) 1025 expires. When the triggering condition is met, the base station 1004 sends a trigger 1022 to the UE 1002, such that the UE 1002, upon receiving the trigger 1022 from the base station 1004, correspondingly creates a gap 1024. Specifically, the UE 1002 may create the gap 1024 at a certain number of slots after receiving the trigger 1022. Thus, the UE 1002 may perform the GNSS measurement in the gap 1024 to re-acquire (or attempt to re-acquire) the GNSS position fix. After re-acquiring the GNSS position fix, the UE 1002 may restart a second GNSS validity duration (or a second remaining GNSS validity duration) 1030, and the UE 1002 may continuously maintain in the connected state 1010. In certain configurations, the trigger 1022 may be a MAC CE, and since the triggering condition is based on the expiration of the GNSS validity duration timer 1025, the trigger 1022 is not periodic.

Figure 11:
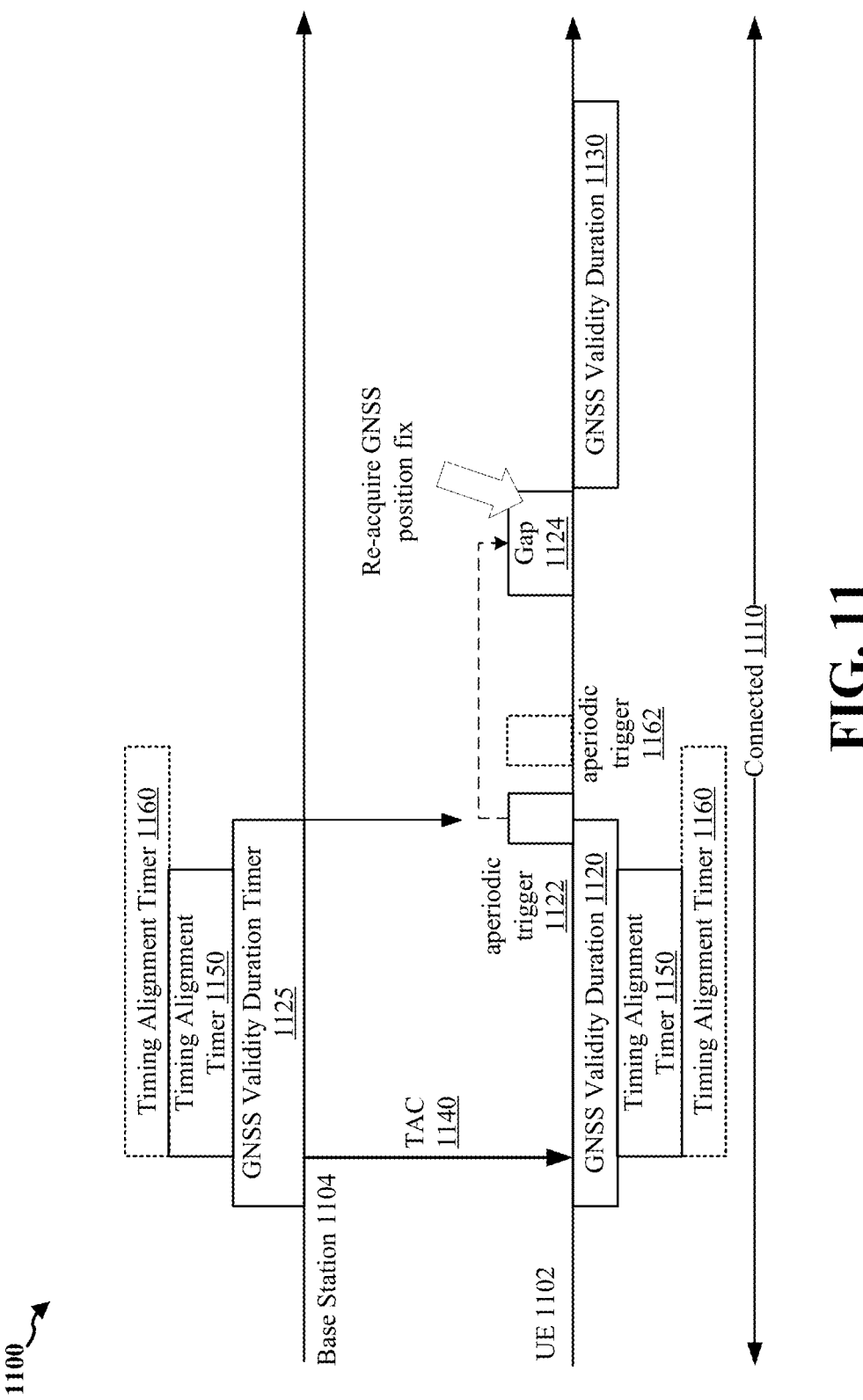
FIG. 11 is a diagram showing another example scheme of the UE receiving network triggers aperiodically from the base station.

In yet another embodiment, the triggering rule may be based on the GNSS validity duration timer and a timing alignment timer. The timing alignment timer is a timer triggered by the TAC, which is configured to control the time the UE 720 is considered uplink time aligned with the base station 710. FIG. 11 is a diagram showing another example scheme 1100 of the UE receiving network triggers aperiodically from the base station. As shown in FIG. 11, when the UE 1102 is in the connected state 1110, the UE 1102 may be in a first GNSS validity duration (or a first remaining GNSS validity duration) 1120. Correspondingly, the base station 1104 creates a GNSS validity duration timer (or a remaining GNSS validity duration timer) 1125 using the GNSS validity duration (or the remaining GNSS validity duration) reported by the UE 1102. When the base station 1104 generates the TAC 1140, the base station 1104 creates the timing alignment timer 1150. The triggering condition occurs when the GNSS validity duration timer 1125 expires or a certain time before the timer expires, i.e., the first GNSS validity duration 1120 ends or a certain time before the first GNSS validity duration 1120 ends, and the timing alignment timer 1150 has expired. In other words, the base station 1104 determines that a trigger is required when the GNSS validity duration timer 1125 expires or a certain time before the GNSS validity duration timer 1125 expires, and the timing alignment timer 1150 has expired. When the triggering condition is met, the base station 1104 sends a trigger 1122 to the UE 1102, such that the UE 1102, upon receiving the trigger 1122 from the base station 1104, correspondingly creates a gap 1124. Specifically, the UE 1102 may create the gap 1124 at a certain number of slots after receiving the trigger 1122. Thus, the UE 1102 may perform the GNSS measurement in the gap 1124 to re-acquire (or attempt to re-acquire) the GNSS position fix. After re-acquiring the GNSS position fix, the UE 1102 may restart a second GNSS validity duration 1130, and the UE 1102 may continuously maintain in the connected state 1110. In certain configurations, the trigger 1122 may be a MAC CE, and since the triggering condition is based on the expiration of the GNSS validity duration timer 1125 and the timing alignment timer 1150, the trigger 1122 is not periodic.

It should be noted that the timing alignment timer 1150 may not always expire before the end of the GNSS validity duration 1120. For example, it is possible that an alternative timing alignment timer 1160 expires after the end of the GNSS validity duration 1120. Specifically, if an alternative timing alignment timer 1160 expires after the end of the GNSS validity duration 1120, the base station 1104 sends a trigger 1162 to the UE 1102 at the end of timing alignment timer 1160, such that the UE 1102, upon receiving the trigger 1162 from the base station 1104, correspondingly creates a gap, which is similar to the gap 1124 correspondingly created based on the trigger 1122.

In a further embodiment, the triggering condition occurs when the GNSS validity duration timer (or the remaining GNSS validity duration timer) 1125 expires or a certain time before the GNSS validity duration timer (or the remaining GNSS validity duration timer) 1125 expires, i.e., the first GNSS validity duration 1120 ends or a certain time before the first GNSS validity duration 1120 ends. In other words, the base station 1104 determines that a trigger is required when the GNSS validity duration timer (or the remaining GNSS validity duration timer) 1125 expires or a certain time before the GNSS validity duration timer (or the remaining GNSS validity duration timer) 1125 expire. When the triggering condition is met, the base station 1104 sends a trigger 1122 to the UE 1102, such that the UE 1102, upon receiving the trigger 1122 from the base station 1104, correspondingly creates a gap 1124. Specifically, the UE 1102 may create the gap 1124 at a certain number of slots after receiving the trigger 1122. In this case, the UE 1102 does not send a scheduling request to the base station 1104 if the UE 1102 re-acquires the GNSS position fix successfully and the timing alignment timer 1160 has not expired.

Figure 12:
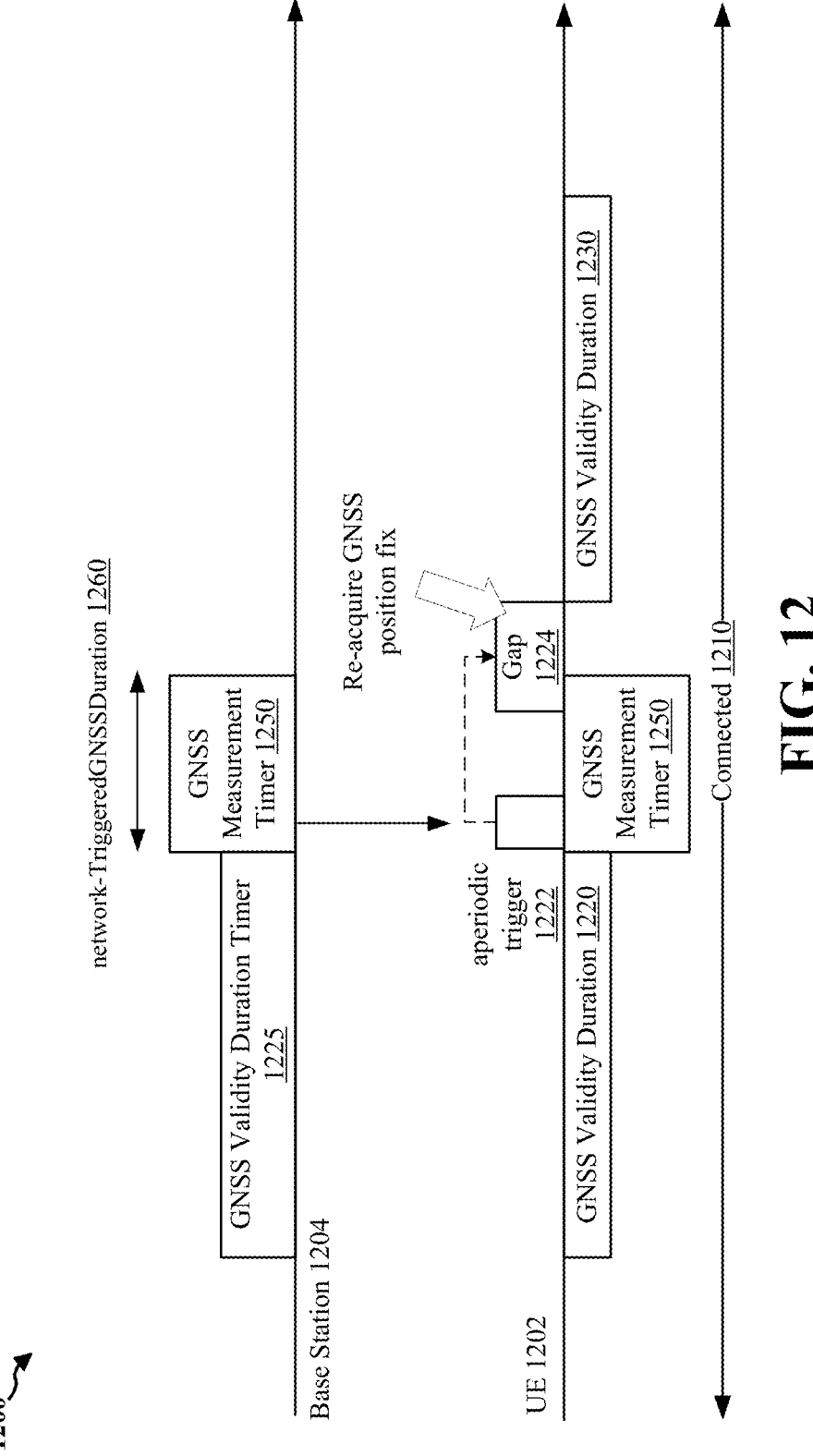
FIG. 12 is a diagram showing yet another example scheme of the UE receiving network triggers aperiodically from the base station.

In a further embodiment, the triggering rule may be based on the GNSS validity duration timer and a measurement parameter, e.g., a higher layer parameter network-TriggeredGNSSDuration. FIG. 12 is a diagram showing yet another example scheme 1200 of the UE receiving network triggers aperiodically from the base station. As shown in FIG. 12, when the UE 1202 is in the connected state 1210, the UE 1202 may be in a first GNSS validity duration (or a first remaining GNSS validity duration) 1220. Correspondingly, the base station 1204 creates a GNSS validity duration timer (or a remaining GNSS validity duration timer) 1225 using the GNSS validity duration (or the remaining GNSS validity duration) reported by the UE 1202. The base station 1204 may generate a GNSS measurement timer 1250, which is a new measurement timer configured by the measurement parameter, i.e., the higher layer parameter network-TriggeredGNSSDuration 1260. Specifically, the base station 1204 may send the measurement parameter, i.e., the higher layer parameter network-TriggeredGNSSDuration 1260, to the UE 1202, such that the UE 1202 also has the GNSS measurement timer 1250. The triggering condition occurs when the GNSS validity duration timer (or the remaining GNSS validity duration timer) 1225 expires, i.e., the first GNSS validity duration (or the first remaining GNSS validity duration) 1220 ends, and a certain time before or at the end of the GNSS measurement timer 1250 has expired. In other words, the base station 1204 determines that a trigger is required when the GNSS validity duration timer 1225 expires, and the GNSS measurement timer 1250 has not expired or has expired. When the triggering condition is met, the base station 1204 sends a trigger 1222 to the UE 1202, such that the UE 1202, upon receiving the trigger 1222 from the base station 1204, correspondingly creates a gap 1224. Specifically, the UE 1202 may create the gap 1224 at a certain number of slots after receiving the trigger 1222. Thus, the UE 1202 may perform the GNSS measurement in the gap 1224 to re-acquire (or attempt to re-acquire) the GNSS position fix. After re-acquiring the GNSS position fix, the UE 1202 may restart a second GNSS validity duration (or a second remaining GNSS validity duration) 1230, and the UE 1202 may continuously maintain in the connected state 1210. In certain embodiments, the higher layer parameter network-TriggeredGNSSDuration 1260 can be cell-specific parameter broadcast on SIB or UE-specific value indicated via dedicated RRC signaling or MAC CE. In certain configurations, the trigger 1222 may be a MAC CE, and since the triggering condition is based on the expiration of the GNSS validity duration timer 1225 and the GNSS measurement timer 1250, the trigger 1222 is not periodic. The new measurement timer (i.e., the GNSS measurement timer 1250) is reset every time the base station 1204 triggers the GNSS measurement.

Figure 13:
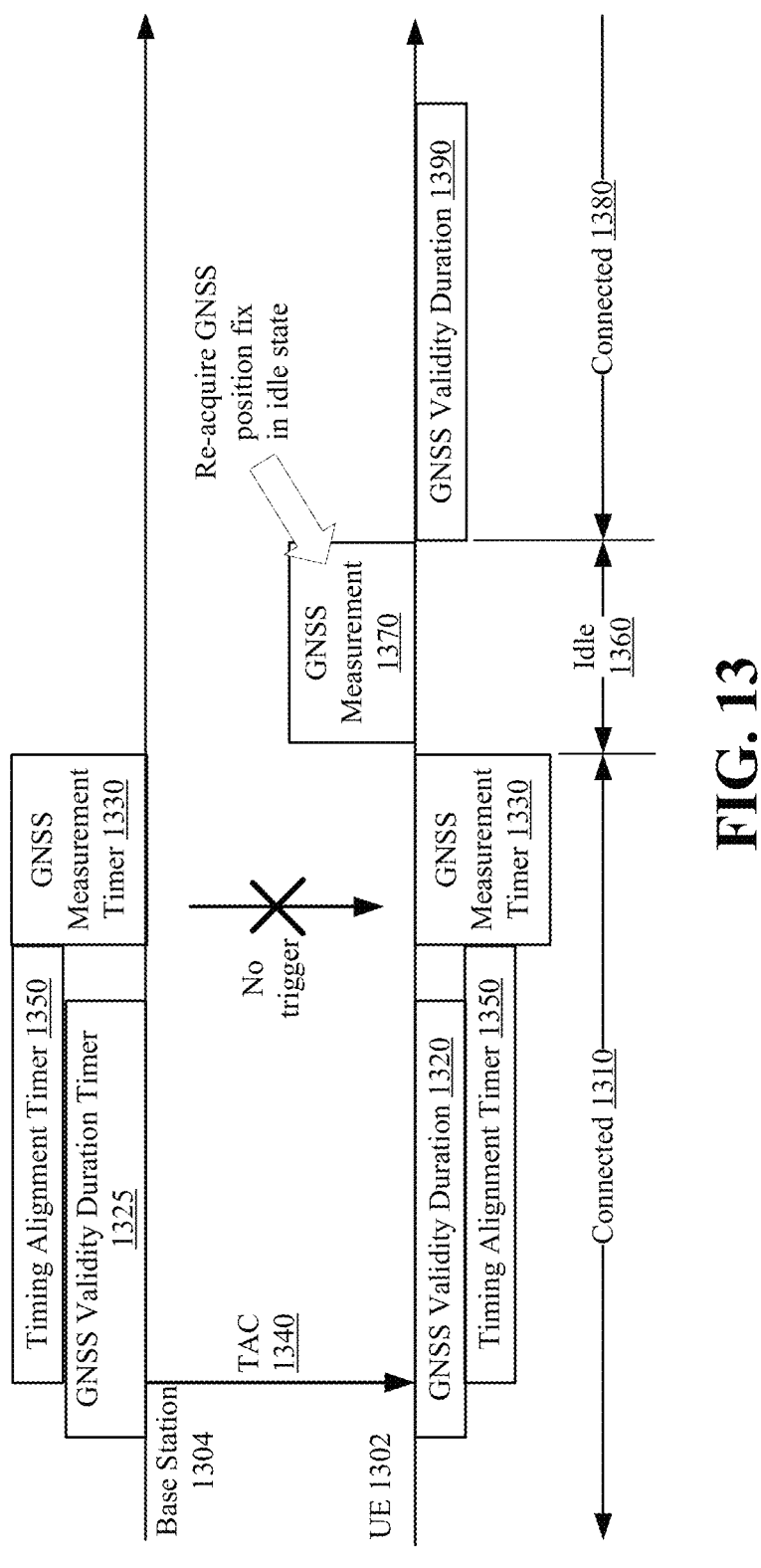
FIG. 13 is a diagram showing an example scheme of the UE not receiving the network trigger from the base station.

In the embodiments as shown in FIG. 11 and FIG. 12, the timing alignment timer 1150 and the GNSS measurement timer 1250 are used separately. In certain configurations, it is possible that these two timers are both used. For example, in certain embodiments, if the UE 720 does not receive a network trigger for the GNSS measurement before the GNSS measurement timer expires, the UE 720 may perform the GNSS measurement to re-acquire the GNSS position fix and performs RRC connection re-establishment when the timing alignment timer has expired. FIG. 13 is a diagram showing an example scheme 1300 of the UE not receiving the network trigger from the base station. As shown in FIG. 13, when the UE 1302 is in the connected state 1310, the UE 1302 may be in a first GNSS validity duration (or a first remaining GNSS validity duration) 1320. Correspondingly, the base station 1304 creates a GNSS validity duration timer (or a remaining GNSS validity duration timer) 1325 using the GNSS validity duration (or the remaining GNSS validity duration) reported by the UE 1302. The base station 1304 also creates the timing alignment timer 1350 when the base station 1304 generates the TAC 1340, and configures the UE 1302 such that the UE 1302 also has the timing alignment timer 1350. Moreover, the base station 1304 may generate a GNSS measurement timer 1330, which is configured by the higher layer parameter network-TriggeredGNSSDuration. Correspondingly, the base station 1304 sends the higher layer parameter network-TriggeredGNSSDuration to the UE 1302 such that the UE 1302 also creates a corresponding GNSS measurement timer 1330. In this case, the base station 1304 may attempt to send a trigger to the UE 1302 when the GNSS validity duration timer (or the remaining GNSS validity duration timer) 1325 expires, similar to the schemes as shown in FIG. 12 and/or FIG. 11. However, if the UE 1302 does not receive this trigger from the base station 1304 after (or at the end of) the GNSS validity duration (or the remaining GNSS validity duration) 1320 and before both the timing alignment timer 1350 and the GNSS measurement timer 1330 expire, the UE 1302 may enter the idle state 1360 when both the timing alignment timer 1350 and the GNSS measurement timer 1330 have expired to perform the GNSS measurement 1370, such that the UE may re-acquire the GNSS position fix in the idle state 1360, and then perform RRC connection re-establishment to re-enter the connected state 1380. After entering the connected state 1380, the UE 1302 may restart a second GNSS validity duration (or a second remaining GNSS validity duration) 1390.

Figure 14:
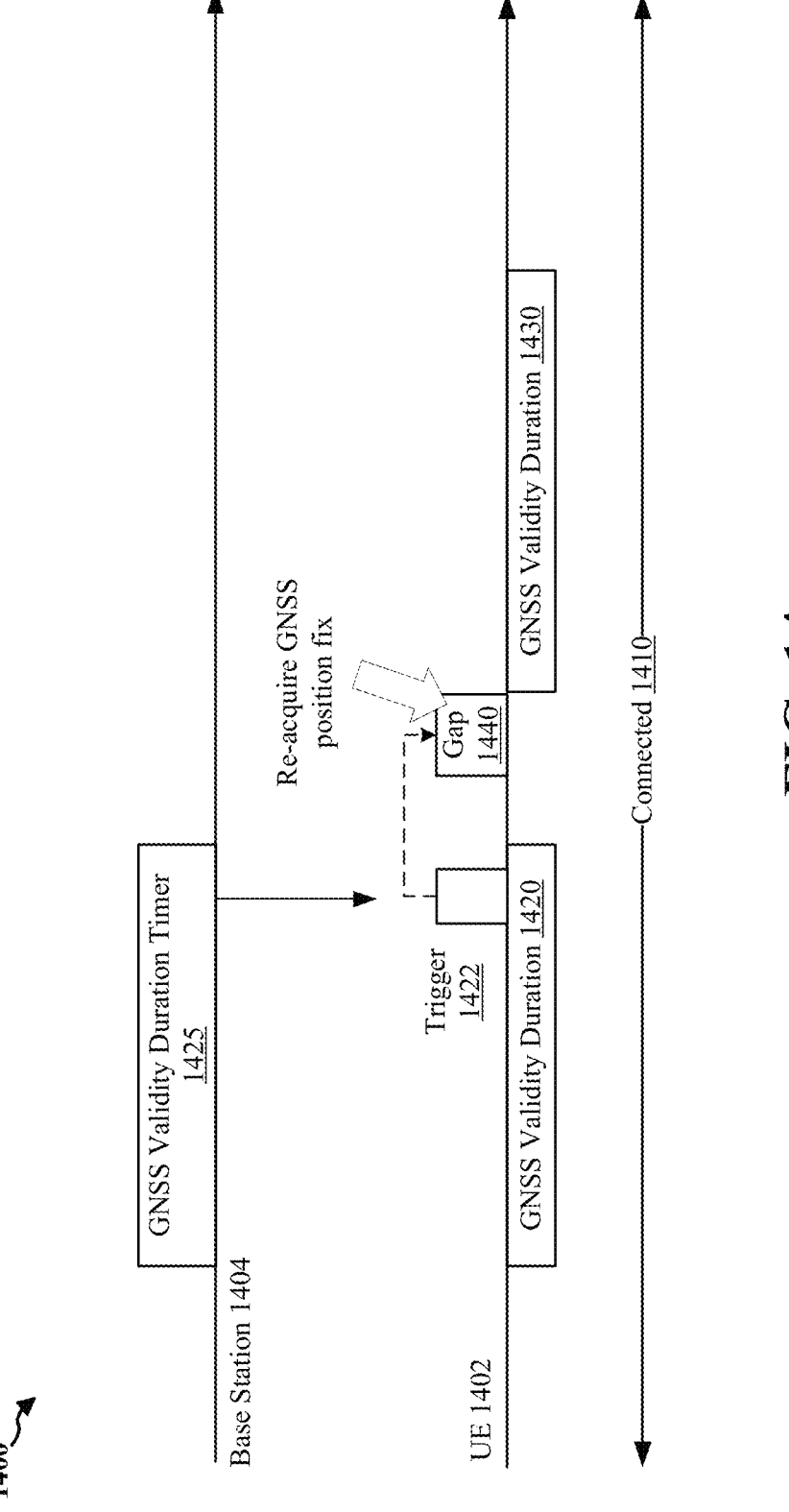
FIG. 14 is a diagram showing yet a further example scheme of the UE receiving network triggers aperiodically from the base station.

In yet a further embodiment, the triggering rule may be based on the GNSS validity duration timer and a scheduling gap for the GNSS measurement. FIG. 14 is a diagram showing yet a further example scheme 1400 of the UE receiving network triggers aperiodically from the base station. As shown in FIG. 14, when the UE 1402 is in the connected state 1410, the UE 1402 may be in a first GNSS validity duration (or a first remaining GNSS validity duration) 1420. Correspondingly, the base station 1404 creates a GNSS validity duration timer (or a remaining GNSS validity duration timer) 1425 using the GNSS validity duration (or the remaining GNSS validity duration) reported by the UE 1402. For GNSS measurement in the RRC connected state, if the base station 1404 (i.e., the eNB) aperiodically triggers the UE 1402 to make GNSS measurement, the base station 1404 may send an instruction (such as a periodic or aperiodic trigger) 1422 to the UE 1402 to configure the UE 1402 to schedule a scheduling gap 1440 for GNSS measurement to re-acquire GNSS position fix. In this case, the triggering condition occurs when the GNSS validity duration timer (or the remaining GNSS validity duration timer) 1425 expires or before the GNSS validity duration timer (or the remaining GNSS validity duration timer) 1425 expires, and the gap 1440 is configured. When the triggering condition is met, the UE 1402, upon determining that the gap 1440 is configured, the UE 1402 is triggered to re-acquire (or attempt to re-acquire) the GNSS position fix in the scheduling gap 1440. After re-acquiring the GNSS position fix in the scheduling gap 1440, the UE 1402 may restart a second GNSS validity duration (or a second remaining GNSS validity duration) 1430, and the UE 1402 may continuously maintain in the connected state 1410.

In certain configurations, in addition to the instruction (i.e., the trigger) 1422 transmitted by the base station 1404, the UE 1402 further receives a measurement parameter from the base station 1404, such that the UE 1402 determines the measurement gap 1440 based on the trigger 1422 and the measurement parameter. In certain embodiments, the measurement parameter may include at least one of: a measurement time duration for acquiring the GNSS position fix, and a measurement time offset for the offset to start the measurement time duration.

It should be noted that the base station 710 can determine the total duration of transmission of packets based on the Buffer Status Report from the UE 720. In certain embodiments, it is also possible that, when configured by the base station 710, the UE 720 may re-acquire the GNSS position fix autonomously if the UE 720 does not receive the trigger to make the GNSS measurement based on the configured timing.

In certain embodiments, based on UE reported GNSS assistance information, the base station 710 can enable the UE 720 to re-acquire GNSS position fix autonomously in the connected state. In other words, the base station 710 may send instructions to configure the UE 720, such that the UE 720 is enabled to re-acquire GNSS position fix autonomously in the connected state by the timer(s). Specifically, instead of sending the network trigger by the base station 710, the base station 710 sends a configuration instruction including the necessary parameters and/or factors for the timer(s) to the UE 720, such that the UE 720 may autonomously re-acquire the GNSS position fix in the connected state based on the timer(s). In certain configurations, the timer(s) being used in this scheme may be similar to the timer(s) as shown in FIGS. 10-14.

Figure 15:
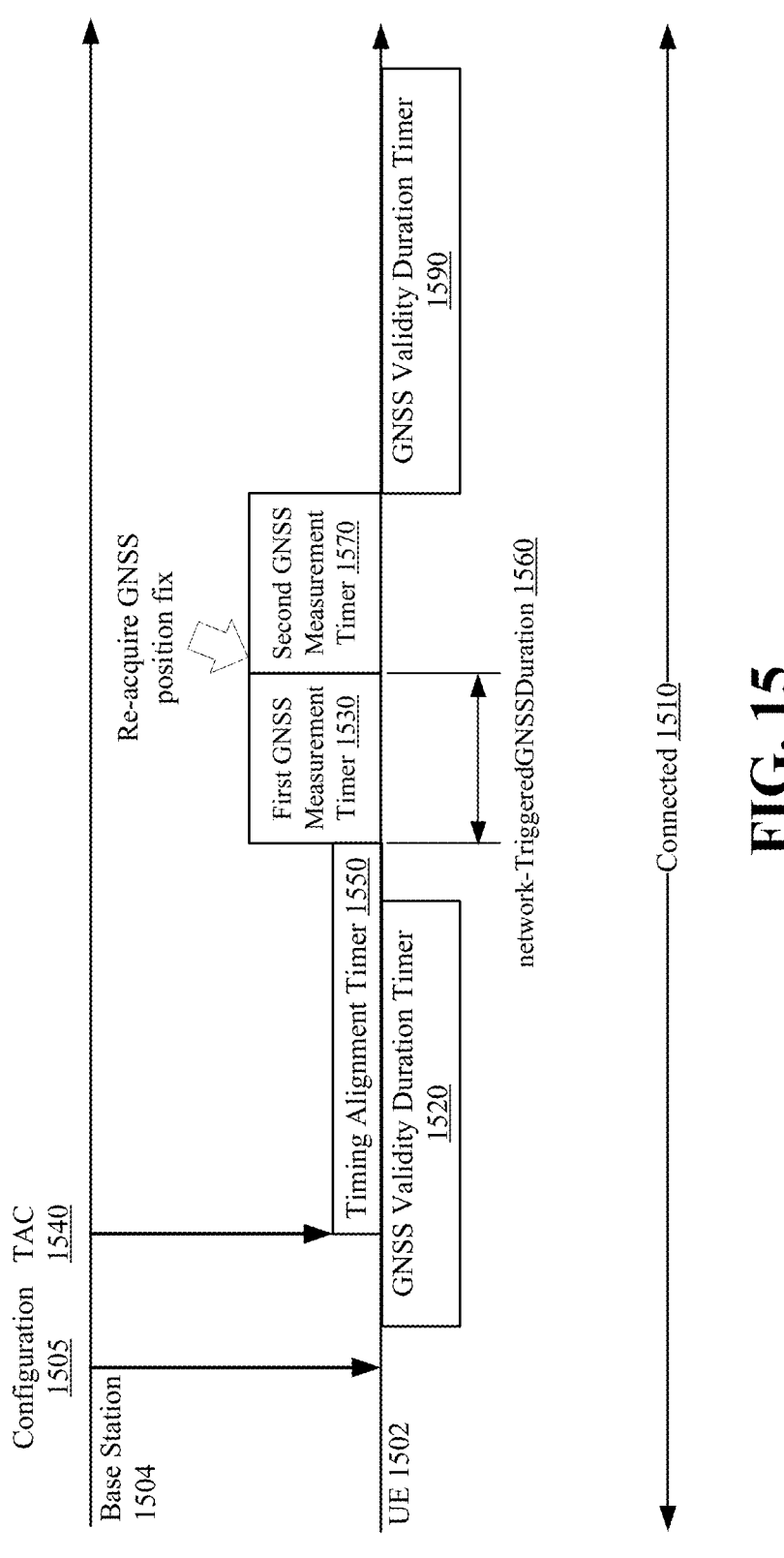
FIG. 15 is a diagram showing an example scheme of the UE being configured by the base station to autonomously re-acquire GNSS position fix.

FIG. 15 is a diagram showing an example scheme of the UE being configured by the base station to autonomously re-acquire GNSS position fix. As shown in FIG. 15, the timer being used in the scheme 1500 is a GNSS validity duration timer (or a remaining GNSS validity duration timer) 1520, a timing alignment timer 1550, and a first GNSS measurement timer 1530 and a second GNSS measurement timer 1570. In this case, the UE may be enabled to autonomously re-acquire the GNSS position fix based on the GNSS validity duration timer (or the remaining GNSS validity duration timer) 1520 only, or based on the GNSS validity duration timer 1520 and the timing alignment timer 1550, or based on the GNSS validity duration timer (or the remaining GNSS validity duration timer) 1520 and the first GNSS measurement timer 1530. When the UE 1502 is in the connected state 1510, the base station 1504 sends the configuration instruction 1505 to the UE 1502. The GNSS validity duration timer (or the remaining GNSS validity duration timer) 1520 is internally started by the UE 1502 and the network (i.e., the base station 1504) based on UE reported GNSS validity duration (or UE reported remaining GNSS validity duration). The base station 1504 also generates the TAC 1540 and sends the TAC 1540 to the UE 1502 for creating the timing alignment timer 1550. Moreover, the configuration instruction 1505 also includes one or more measurement parameters, e.g., a higher layer parameter network-TriggeredGNSSDuration 1560, such that the UE 1502 may create a first GNSS measurement timer 1530 and a second GNSS measurement timer 1570 based on the value of the measurement parameter(s). In certain configurations, when the GNSS validity duration timer (or the remaining GNSS validity duration timer) 1520 expires, i.e., the corresponding GNSS validity duration (or the corresponding remaining GNSS validity duration) ends, the UE 1502 is enabled to autonomously re-acquire (or attempt to re-acquire) the GNSS position fix when the GNSS validity duration timer (or the remaining GNSS validity duration timer) 1520 expires in the second GNSS measurement timer 1570, where the second GNSS measurement timer 1570 starts at the end of the GNSS validity duration timer (or the remaining GNSS validity duration timer) 1520 expires. In this case, the UE 1502 does not send a scheduling request if the UE 1502 acquires the GNSS position fix and the timing alignment timer 1550 has not expired. In certain configurations, when the GNSS validity duration timer (or the remaining GNSS validity duration timer) 1520 expires and the timing alignment timer 1550 has expired, the UE 1502 is enabled to autonomously re-acquire (or attempt to re-acquire) the GNSS position fix in the second GNSS measurement timer 1570, where the second GNSS measurement timer 1570 starts at the end of the GNSS validity duration timer (or the remaining GNSS validity duration timer) 1520 expires and the timing alignment timer 1550 has expired. In certain configurations, when the GNSS validity duration timer (or the remaining GNSS validity duration timer) 1520 expires and the first GNSS measurement timer 1530 has expired, the UE 1502 is enabled to autonomously re-acquire (or attempt to re-acquire) the GNSS position fix in the second GNSS measurement timer 1570, where the second GNSS measurement timer 1570 starts at the end of the GNSS validity duration timer (or the remaining GNSS validity duration timer) 1520 expires and the first GNSS measurement timer 1530 has expired. After the UE 1502 re-acquires the GNSS position fix, the UE 1502 restarts another GNSS validity duration timer (or another remaining GNSS validity duration timer) 1590.

In the embodiment as shown in FIG. 15, the UE 1502 is enabled to autonomously re-acquire (or attempt to re-acquire) the GNSS position fix based on the instruction (i.e., the configuration 1505) received from the base station 1504. In certain configurations, the UE 1502 may be enabled to autonomously re-acquire (or attempt to re-acquire) the GNSS position fix based on the instruction (i.e., the configuration 1505) received from the base station 1504 and an additional no-trigger condition, i.e., when the UE 1502 does not receive the aperiodic trigger from the base station 1504. For example, in one embodiment, the UE 1502 may be enabled to autonomously re-acquire (or attempt to re-acquire) the GNSS position fix based on the instruction (i.e., the configuration 1505) received from the base station 1504 and when the UE 1502 does not receive the aperiodic trigger from the base station 1504 no later than the GNSS validity duration or the remaining GNSS validity duration expired. In another embodiment, the UE 1502 may be enabled to autonomously re-acquire (or attempt to re-acquire) the GNSS position fix based on the instruction (i.e., the configuration 1505) received from the base station 1504 and when the UE 1502 does not receive the aperiodic trigger from the base station 1504 no later than the GNSS validity duration or the remaining GNSS validity duration and a timing alignment timer 1550 associated with an uplink time alignment between the UE and the base station expired. In another embodiment, the UE 1502 may be enabled to autonomously re-acquire (or attempt to re-acquire) the GNSS position fix based on the instruction (i.e., the configuration 1505) received from the base station 1504 and when the UE 1502 does not receive the aperiodic trigger from the base station 1504 no later than the GNSS validity duration or the remaining GNSS validity duration and the first GNSS measurement timer 1530 configured by the higher layer parameter network-TriggeredGNSSDuration 1560 associated with the GNSS measurement parameter expired.

FIG. 16 is a flow chart of a method (process) for wireless communication of a UE. The method may be performed by a UE (e.g., the UE 720). At operation 1610, the UE determines a GNSS validity duration or a remaining GNSS validity duration indicating a time duration for which a GNSS position fix is valid. At operation 1620, the UE reports, to a base station, GNSS assistance information including the GNSS validity duration or the remaining GNSS validity duration. At operation 1630, the UE attempts to acquire, at the UE and in a RRC connected state, the GNSS position fix periodically or aperiodically.

In certain configurations, the UE receives, from the base station, a periodicity parameter indicating a periodicity for acquiring the GNSS position fix no later than the GNSS validity duration or the remaining GNSS validity duration expired, and the UE attempts to acquire the GNSS position fix periodically according to the periodicity.

In certain configurations, the UE monitors an aperiodic trigger transmitted from the base station. The UE receives the aperiodic trigger and determines a measurement gap. The UE attempts to acquire the GNSS position fix in the measurement gap.

In certain configurations, when a frequency error and a timing error are within frequency and timing error requirements with legacy closed loop time correction, monitoring an aperiodic trigger transmitted from the base station after an original GNSS validity duration expires within a duration X. The duration X is equal to a remaining timing alignment timer or another value configured by the base station.

In certain configurations, the UE monitors the aperiodic trigger transmitted from the base station no later than the GNSS validity duration or the remaining GNSS validity duration expired. Alternatively, the UE monitors the aperiodic trigger transmitted from the base station no later than the GNSS validity duration or the remaining GNSS validity duration and a timing alignment timer associated with an uplink time alignment between the UE and the base station expired. Alternatively, the UE monitors the aperiodic trigger transmitted from the base station no later than the GNSS validity duration or the remaining GNSS validity duration and a new timer configured by a higher layer parameter network-TriggeredGNSSDuration expired. In certain configurations, the higher layer parameter network-TriggeredGNSSDuration is a cell-specific parameter broadcast on SIB or is a UE-specific parameter indicated via RCC dedicated signaling or MAC CE, and the new timer is reset every time the UE does GNSS measurements.

In certain configurations, the UE enters an idle state and performing RRC connection re-establishment in the idle state, when the UE does not receive the aperiodic trigger from the base station no later than the GNSS validity duration or the remaining GNSS validity duration expires, or when the UE does not receive the aperiodic trigger from the base station no later than the GNSS validity duration or the remaining GNSS validity duration and a timing alignment timer associated with an uplink time alignment between the UE and the base station expire, or when the UE does not receive the aperiodic trigger from the base station no later than the GNSS validity duration or the remaining GNSS validity duration and a new timer configured by higher layer parameter network-TriggeredGNSSDuration expire.

In certain configurations, the UE receives the aperiodic trigger and determining the measurement gap starts at the time when GNSS validity duration or the remaining GNSS validity duration expires. Alternatively, the UE receives the aperiodic trigger and determining the measurement gap starts at the time when GNSS validity duration or the remaining GNSS validity duration and the timing alignment timer expire. Alternatively, the UE receives the aperiodic trigger and determining the measurement gap starts at the time when GNSS validity duration or the remaining GNSS validity duration and the new timer configured by a higher layer parameter network-TriggeredGNSSDuration expire.

In certain configurations, the UE receives, from the base station, a measurement parameter. The UE determines the measurement gap based on the aperiodic trigger and the measurement parameter. In certain configurations, the measurement parameter includes at least one of a measurement time duration for acquiring the GNSS position fix, and a measurement time offset for the offset to start the measurement time duration.

In certain configurations, the UE does not send a scheduling request if the UE acquires the GNSS position fix successfully and a timing alignment timer has not expired.

In certain configurations, the UE receives an instruction from the base station to configure the UE to autonomously acquire the GNSS position fix. Alternatively, the UE receives an instruction from the base station to configure the UE to autonomously acquire the GNSS position fix and when the UE does not receive the aperiodic trigger from the base station no later than the GNSS validity duration or the remaining GNSS validity duration expired. The UE attempts to acquire the GNSS position fix autonomously after or at the end of the GNSS validity duration or the remaining GNSS validity duration has expired.

In certain configurations, the UE receives an instruction from the base station to configure the UE to autonomously acquire the GNSS position fix. Alternatively, the UE receives an instruction from the base station to configure the UE to autonomously acquire the GNSS position fix and when the UE does not receive the aperiodic trigger from the base station no later than the GNSS validity duration or the remaining GNSS validity duration and a timing alignment timer associated with an uplink time alignment between the UE and the base station expired. The UE attempts to acquire the GNSS position fix autonomously after or at the end of the GNSS validity duration or the remaining GNSS validity duration and a timing alignment timer associated with an uplink time alignment between the UE and the base station has expired.

In certain configurations, the UE receives an instruction from the base station to configure the UE to autonomously acquire the GNSS position fix, and the instruction includes a measurement parameter indicating a measurement time for acquiring the GNSS position fix after the GNSS validity duration or the remaining GNSS validity duration. Alternatively, the UE receives an instruction from the base station to configure the UE to autonomously acquire the GNSS position fix and when the UE does not receive the aperiodic trigger from the base station no later than the GNSS validity duration or the remaining GNSS validity duration and the new timer configured by the higher layer parameter network-TriggeredGNSSDuration associated with the GNSS measurement parameter expired. The UE attempts to acquire the GNSS position fix autonomously after or at the end of the GNSS validity duration or the remaining GNSS validity duration has expired and that a new timer configured by a higher layer parameter network-TriggeredGNSSDuration associated with a GNSS measurement parameter has expired. In certain configurations, the higher layer parameter network-TriggeredGNSSDuration is a cell-specific parameter broadcast on SIB or is a UE-specific parameter indicated via RCC dedicated signaling or MAC CE, and the new timer is reset every time the UE does GNSS measurements. In certain configurations, the GNSS measurement parameter includes at least one of a measurement time duration for acquiring the GNSS position fix, and a measurement time offset for the offset to start the measurement time duration.

FIG. 17 is a flow chart of a method (process) for wireless communication of a base station. The method may be performed by a base station (e.g., the base station 710). At operation 1710, the base station receives, from a UE, GNSS assistance information including a GNSS validity duration or a remaining GNSS validity duration indicating a time duration for which a GNSS position fix at the UE is valid. At operation 1720, the base station sends an instruction to the UE in a radio resource control (RRC) connected state for the UE in the RRC connected state to acquire the GNSS position fix periodically or aperiodically.

In certain configurations, the instruction is a periodicity parameter indicating a periodicity for the UE in the RRC connected state to periodically acquire the GNSS position fix no later than the GNSS validity duration or the remaining GNSS validity duration expired according to the periodicity.

In certain configurations, the instruction is sent to the UE for determining a measurement gap and the instruction is an aperiodic trigger. Alternatively, the instruction is an aperiodic trigger and a higher layer parameter, where a new timer is configured by the higher layer parameter. Alternatively, the instruction is an aperiodic trigger and a measurement parameter, where the measurement parameter comprises at least one of a measurement time duration for acquiring the GNSS position fix, and a measurement time offset for the offset to start the measurement time duration for acquiring the GNSS position fix.

In certain configurations, the instruction is for configuring the UE for autonomously acquiring the GNSS position fix.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining, at the UE, a global navigation satellite system (GNSS) validity duration or a remaining GNSS validity duration indicating a time duration for which a GNSS position fix is valid;

reporting, from the UE to a base station, GNSS assistance information including the GNSS validity duration or the remaining GNSS validity duration;

attempting to acquire, at the UE and in a radio resource control (RRC) connected state, the GNSS position fix periodically or aperiodically; and when the UE is attempting to acquire the GNSS position fix aperiodically:

monitoring an aperiodic trigger transmitted from the base station; and receiving the aperiodic trigger and determining a measurement gap, wherein the attempt to acquire the GNSS position fix is conducted in the measurement gap.

2. The method of claim 1, further comprising:

when the UE is attempting to acquire the GNSS position fix periodically:

receiving, from the base station, a periodicity parameter indicating a periodicity for acquiring the GNSS position fix no later than the GNSS validity duration or the remaining GNSS validity duration expires, wherein the attempt to acquire the GNSS position fix is conducted periodically according to the periodicity.

3. The method of claim 1, further comprising:

when a frequency error and a timing error are within frequency and timing error requirements with legacy closed loop time correction, monitoring an aperiodic trigger transmitted from the base station after an original GNSS validity duration expires within a duration X;

wherein the duration X is equal to a remaining timing alignment timer or another value configured by the base station.

4. The method of claim 1, further comprising:

monitoring the aperiodic trigger transmitted from the base station no later than the GNSS validity duration or the remaining GNSS validity duration expires, or monitoring the aperiodic trigger transmitted from the base station no later than the GNSS validity duration or the remaining GNSS validity duration and a timing alignment timer associated with an uplink time alignment between the UE and the base station expire, or monitoring the aperiodic trigger transmitted from the base station no later than the GNSS validity duration or the remaining GNSS validity duration and a new timer configured by a higher layer parameter network-TriggeredGNSSDuration expire.

5. The method of claim 4, wherein the higher layer parameter network-TriggeredGNSSDuration is a cell-specific parameter broadcast on SIB or is a UE-specific parameter indicated via RCC dedicated signaling or MAC CE, and the new timer is reset every time the UE does GNSS measurements.

6. The method of claim 4, further comprising:

entering an idle state and performing RRC connection re-establishment in the idle state, when the UE does not receive the aperiodic trigger from the base station no later than the GNSS validity duration or the remaining GNSS validity duration expires, or when the UE does not receive the aperiodic trigger from the base station no later than the GNSS validity duration or the remaining GNSS validity duration and a timing alignment timer associated with an uplink time alignment between the UE and the base station expire, or when the UE does not receive the aperiodic trigger from the base station no later than the GNSS validity duration or the remaining GNSS validity duration and a new timer configured by higher layer network-TriggeredGNSSDuration expire.

7. The method of claim 1, further comprising:

receiving the aperiodic trigger and determining the measurement gap starts at the time when GNSS validity duration or the remaining GNSS validity duration expires, or receiving the aperiodic trigger and determining the measurement gap starts at the time when GNSS validity duration or the remaining GNSS validity duration and the timing alignment timer expire, or receiving the aperiodic trigger and determining the measurement gap starts at the time when GNSS validity duration or the remaining GNSS validity duration and the new timer configured by a higher layer parameter network-TriggeredGNSSDuration expire.

8. The method of claim 1, further comprising:

receiving, from the base station, a measurement parameter;

determining the measurement gap based on the aperiodic trigger and the measurement parameter.

9. The method of claim 8, wherein the measurement parameter comprises at least one of:

a measurement time duration for acquiring the GNSS position fix, and a measurement time offset for the offset to start the measurement time duration for acquiring the GNSS position fix.

10. The method of claim 1, wherein the UE does not send a scheduling request if the UE acquires the GNSS position fix successfully and a timing alignment timer has not expired.

11. The method of claim 1, further comprising:

receiving an instruction from the base station to configure the UE to autonomously acquire the GNSS position fix, wherein the attempt to acquire the GNSS position fix is conducted autonomously after or at the end of the GNSS validity duration or the remaining GNSS validity duration has expired, or receiving an instruction from the base station to configure the UE to autonomously acquire the GNSS position fix and when the UE does not receive the aperiodic trigger from the base station no later than the GNSS validity duration or the remaining GNSS validity duration expires, wherein the attempt to acquire the GNSS position fix is conducted autonomously after or at the end of the GNSS validity duration or the remaining GNSS validity duration has expired.

12. The method of claim 1, further comprising:

receiving an instruction from the base station to configure the UE to autonomously acquire the GNSS position fix, wherein the attempt to acquire the GNSS position fix is conducted autonomously after or at the end of the GNSS validity duration or the remaining GNSS validity duration and a timing alignment timer associated with an uplink time alignment between the UE and the base station has expired, or receiving an instruction from the base station to configure the UE to autonomously acquire the GNSS position fix and when the UE does not receive the aperiodic trigger from the base station no later than the GNSS validity duration or the remaining GNSS validity duration and a timing alignment timer associated with an uplink time alignment between the UE and the base station expire, wherein the attempt to acquire the GNSS position fix is conducted autonomously after or at the end of the GNSS validity duration or the remaining GNSS validity duration and a timing alignment timer associated with an uplink time alignment between the UE and the base station has expired.

13. The method of claim 1, further comprising:

receiving an instruction from the base station to configure the UE to autonomously acquire the GNSS position fix, wherein the instruction includes a measurement parameter, and the attempt to acquire the GNSS position fix is conducted autonomously after or at the end of the GNSS validity duration or the remaining GNSS validity duration has expired and that a new timer configured by a higher layer parameter network-TriggeredGNSS-Duration associated with a GNSS measurement parameter has expired, or receiving an instruction from the base station to configure the UE to autonomously acquire the GNSS position fix and when the UE does not receive the aperiodic trigger from the base station no later than the GNSS validity duration or the remaining GNSS validity duration and the new timer configured by the higher layer parameter network-TriggeredGNSSDuration associated with the GNSS measurement parameter expire, wherein the attempt to acquire the GNSS position fix is conducted autonomously after or at the end of the GNSS validity duration or the remaining GNSS validity duration and the new timer configured by the higher layer parameter network-TriggeredGNSSDuration associated with the GNSS measurement parameter has expired.

14. The method of claim 13, wherein the higher layer parameter network-TriggeredGNSSDuration is a cell-specific parameter broadcast on SIB or is a UE-specific parameter indicated via RCC dedicated signaling or MAC CE, and the new timer is reset every time the UE does GNSS measurements.

15. The method of claim 13, wherein the GNSS measurement parameter comprises at least one of:

a measurement time duration for acquiring the GNSS position fix, and a measurement time offset for the offset to start the measurement time duration for acquiring the GNSS position fix.

16. A method of wireless communication of a base station, comprising:

receiving, from a user equipment (UE), global navigation satellite system (GNSS) assistance information including a GNSS validity duration or a remaining GNSS validity duration indicating a time duration for which a GNSS position fix at the UE is valid; and sending an instruction to the UE in a radio resource control (RRC) connected state for the UE in the RRC connected state to acquire the GNSS position fix periodically or aperiodically;

wherein when the instruction is for the UE to acquire the GNSS position fix aperiodically:

the instruction is sent to the UE for determining a measurement gap and the instruction is an aperiodic trigger, or the instruction is an aperiodic trigger and a higher layer parameter, wherein a new timer is configured by the higher layer parameter, or the instruction is an aperiodic trigger and a measurement parameter, wherein the measurement parameter comprises at least one of:

a measurement time duration for acquiring the GNSS position fix, and a measurement time offset for the offset to start the measurement time duration for acquiring the GNSS position fix.

17. The method of claim 16, wherein when the instruction is for the UE to acquire the GNSS position fix periodically, the instruction is a periodicity parameter indicating a GNSS position fix acquiring periodicity for the UE in the RRC connected state to periodically acquire the GNSS position fix no later than the GNSS validity duration or the remaining GNSS validity duration expired according to the periodicity.

18. The method of claim 16, wherein the instruction is for configuring the UE for autonomously acquiring the GNSS position fix.

* * * * *